United States Patent
Takahashi et al.

(10) Patent No.: US 12,084,024 B2
(45) Date of Patent: *Sep. 10, 2024

(54) CONTROL SYSTEM AND CONTROL METHOD

(71) Applicant: Robert Bosch GmbH, Stuttgart (DE)

(72) Inventors: Yoshiki Takahashi, Kanagawa (JP); Shoichiro Kaneko, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 401 days.

This patent is subject to a terminal disclaimer.

(21) Appl. No.: 17/603,371

(22) PCT Filed: Apr. 3, 2020

(86) PCT No.: PCT/IB2020/053220
§ 371 (c)(1),
(2) Date: Oct. 13, 2021

(87) PCT Pub. No.: WO2020/217124
PCT Pub. Date: Oct. 29, 2020

(65) Prior Publication Data
US 2022/0212641 A1 Jul. 7, 2022

(30) Foreign Application Priority Data

Apr. 15, 2019 (JP) .................................. 2019-077213

(51) Int. Cl.
*B60T 8/17* (2006.01)
*B60T 8/175* (2006.01)
(Continued)

(52) U.S. Cl.
CPC ............ *B60T 8/1706* (2013.01); *B60T 8/175* (2013.01); *B60T 8/3225* (2013.01); *B60T 2260/06* (2013.01)

(58) Field of Classification Search
CPC ...... B60T 8/1706; B60T 8/175; B60T 8/3225; B60T 8/176; B60T 8/17; B60T 8/26; B60T 8/30; B60T 8/1766; B60T 2260/06
See application file for complete search history.

(56) References Cited

U.S. PATENT DOCUMENTS 5,816,670 A * 10/1998 Yamada .............. B60T 8/17636
303/194
6,424,907 B1 * 7/2002 Rieth .................... G01M 1/122
340/440

(Continued)

FOREIGN PATENT DOCUMENTS

EP          2551158 A1    1/2013
JP       2018024324 A    2/2018

OTHER PUBLICATIONS

International Search Report and Written Opinion for Application No. PCT/IB2020/053220 dated Jul. 22, 2020 (9 pages).

*Primary Examiner* — Thomas W Irvin
(74) *Attorney, Agent, or Firm* — Michael Best & Friedrich LLP (57) ABSTRACT

The present invention obtains a control system and a control method capable of appropriately executing slip suppression control for a straddle-type vehicle.
In the control system and the control method according to the present invention, a damping characteristic of a suspension is controlled. In addition, a damping force to be generated to the suspension is estimated on the basis of the damping characteristic and a stroke speed of the suspension, and the slip suppression control for suppressing slippage of the straddle-type vehicle is executed by using a target amount corresponding to the estimated damping force.

7 Claims, 5 Drawing Sheets

(51) Int. Cl.
 *B60T 8/176* (2006.01)
 *B60T 8/32* (2006.01)

(56) References Cited

U.S. PATENT DOCUMENTS

| | | | | |
|---|---|---|---|---|
| 8,560,173 | B2* | 10/2013 | Matsuda | B60T 8/1706 280/5.502 |
| 8,958,968 | B2* | 2/2015 | Kobayashi | B60K 28/16 701/79 |
| 9,120,469 | B2* | 9/2015 | Katsuyama | B60K 17/356 |
| 9,156,328 | B2* | 10/2015 | Kikuchi | B60T 7/12 |
| 10,814,843 | B2* | 10/2020 | Hasegawa | B60T 8/50 |
| 10,994,800 | B2* | 5/2021 | Noguchi | B60T 8/1706 |
| 2003/0066720 | A1* | 4/2003 | Sakamoto | B60T 8/1706 188/177 |
| 2003/0141158 | A1* | 7/2003 | Beringer | B60T 8/1831 188/349 |
| 2009/0037063 | A1* | 2/2009 | Ogawa | B60T 8/1766 701/70 |
| 2013/0030649 | A1* | 1/2013 | Matsuda | B60T 8/3225 701/38 |
| 2014/0214300 | A1* | 7/2014 | Hasegawa | B62L 3/023 701/79 |
| 2014/0309902 | A1* | 10/2014 | Katsuyama | B60W 10/22 701/70 |
| 2015/0081170 | A1* | 3/2015 | Kikuchi | B60G 17/06 701/37 |
| 2015/0127240 | A1 | 5/2015 | Nozawa | |
| 2015/0232074 | A1* | 8/2015 | Iizuka | B60T 8/1706 701/34.1 |
| 2018/0265057 | A1* | 9/2018 | Hasegawa | B60T 8/172 |
| 2019/0283835 | A1* | 9/2019 | Noguchi | B60T 8/1706 |
| 2022/0153246 | A1* | 5/2022 | Kaneko | B60T 8/1706 |
| 2022/0194352 | A1* | 6/2022 | Kaneko | B60W 30/04 |
| 2022/0250595 | A1* | 8/2022 | Eisele | B60T 8/17551 |
| 2022/0388485 | A1* | 12/2022 | Hirao | B60W 40/114 |

* cited by examiner

CONTROL SYSTEM AND CONTROL METHOD

BACKGROUND OF THE INVENTION

The present disclosure relates to a control system and a control method capable of appropriately executing slip suppression control for a straddle-type vehicle.

Conventionally, as control related to behavior of a straddle-type vehicle such as a motorcycle, slip suppression control for suppressing slippage of the straddle-type vehicle has been available. As the slip suppression control, for example, as disclosed in JP-A-2018-024324, control such as anti-lock brake control for suppressing locking of a wheel during braking of the straddle-type vehicle has been available.

However, in the related art, there is a case where it is difficult to appropriately execute the slip suppression control due to insufficient optimization of a target amount (for example, a tire friction circle (hereinafter also simply referred to as a friction circle)) used in the slip suppression control. By the way, compared to other vehicles, the behavior of the straddle-type vehicle such as the motorcycle tends to become unstable. Thus, it is particularly important to suppress the slippage of the straddle-type vehicle. Therefore, proposal of a technique of further appropriately executing the slip suppression control for the straddle-type vehicle has been desired.

SUMMARY OF THE INVENTION

The present invention has been made with the above-described problem as the background and therefore obtains a control system and a control method capable of appropriately executing slip suppression control for a straddle-type vehicle.

A control system according to the present invention is a control system for controlling behavior of a straddle-type vehicle that includes a suspension, and includes a control section that controls a damping characteristic of the suspension. The control section estimates a damping force to be generated to the suspension on the basis of the damping characteristic and a stroke speed of the suspension, and executes slip suppression control for suppressing slippage of the straddle-type vehicle by using a target amount corresponding to the estimated damping force.

A control method according to the present invention is a control method controlling behavior of a straddle-type vehicle that includes a suspension, and a damping characteristic of the suspension is controlled by a control system. The control method includes: an estimation step of estimating a damping force to be generated to the suspension on the basis of the damping characteristic and a stroke speed of the suspension; and an execution step of executing slip suppression control for suppressing slippage of the straddle-type vehicle by using a target amount corresponding to the estimated damping force.

In the control system and the control method according to the present invention, the damping characteristic of the suspension is controlled. In addition, the damping force to be generated to the suspension is estimated on the basis of the damping characteristic and the stroke speed of the suspension, and the slip suppression control for suppressing the slippage of the straddle-type vehicle is executed by using the target amount (for example, a friction circle) corresponding to the estimated damping force. In this way, it is possible to execute the slip suppression control after optimizing the target amount used in the slip suppression control. Therefore, it is possible to appropriately execute the slip suppression control for the straddle-type vehicle.

DETAILED DESCRIPTION

A description will hereinafter be made on a control system according to the present invention with reference to the drawings. Hereinafter, a description will be made on the control system used for a two-wheeled motorcycle. However, the control system according to the present invention may be used for a straddle-type vehicle other than the two-wheeled motorcycle (for example, a three-wheeled motorcycle, an all-terrain vehicle, a bicycle, or the like). The straddle-type vehicle means a vehicle that a rider straddles, and includes a scooter and the like.

A description will hereinafter be made on a case where each of a front-wheel brake mechanism and a rear-wheel brake mechanism is provided in one unit; however, at least one of the front-wheel brake mechanism and the rear-wheel brake mechanism may be provided in multiple units. Alternatively, one of the front-wheel brake mechanism and the rear-wheel brake mechanism may not be provided.

In addition, a description will hereinafter be made on a case where an engine is mounted as a drive source capable of outputting power for driving wheels of the motorcycle. However, as the drive source for the motorcycle, a drive source other than the engine (for example, a motor) may be mounted, or a plurality of the drive sources may be mounted.

A description will hereinafter be made on a case where a control section in the control system can execute anti-lock brake control and traction control as slip suppression control. However, the control section only needs to be able to execute at least one type of the slip suppression control and, for example, may be able to execute only one of the anti-lock brake control and the traction control.

A configuration, operation, and the like, which will be described below, merely constitute one example. The control system and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

<Configuration of Motorcycle>

A description will be made on a configuration of a motorcycle 100 to which a control system 90 according to an embodiment of the present invention is mounted with reference to FIG. 1 to FIG. 4.

Figure 1:
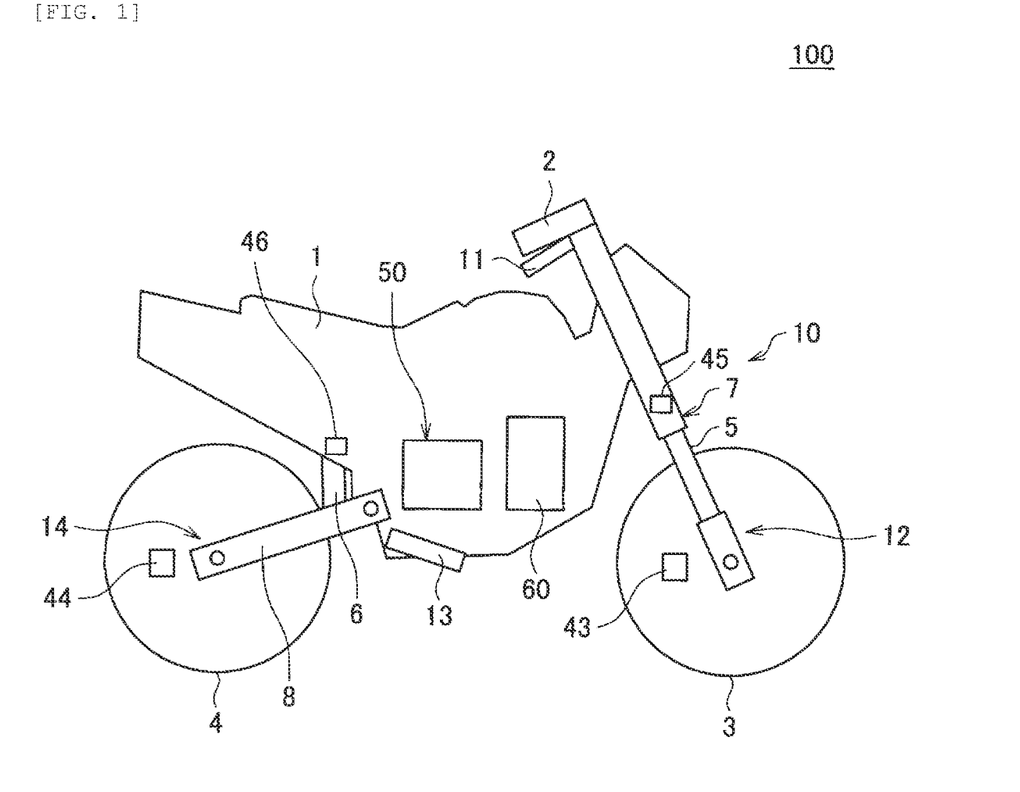
FIG. 1 is a schematic view of a configuration of a motorcycle to which a control system according to an embodiment of the present invention is mounted.
Figure 2:
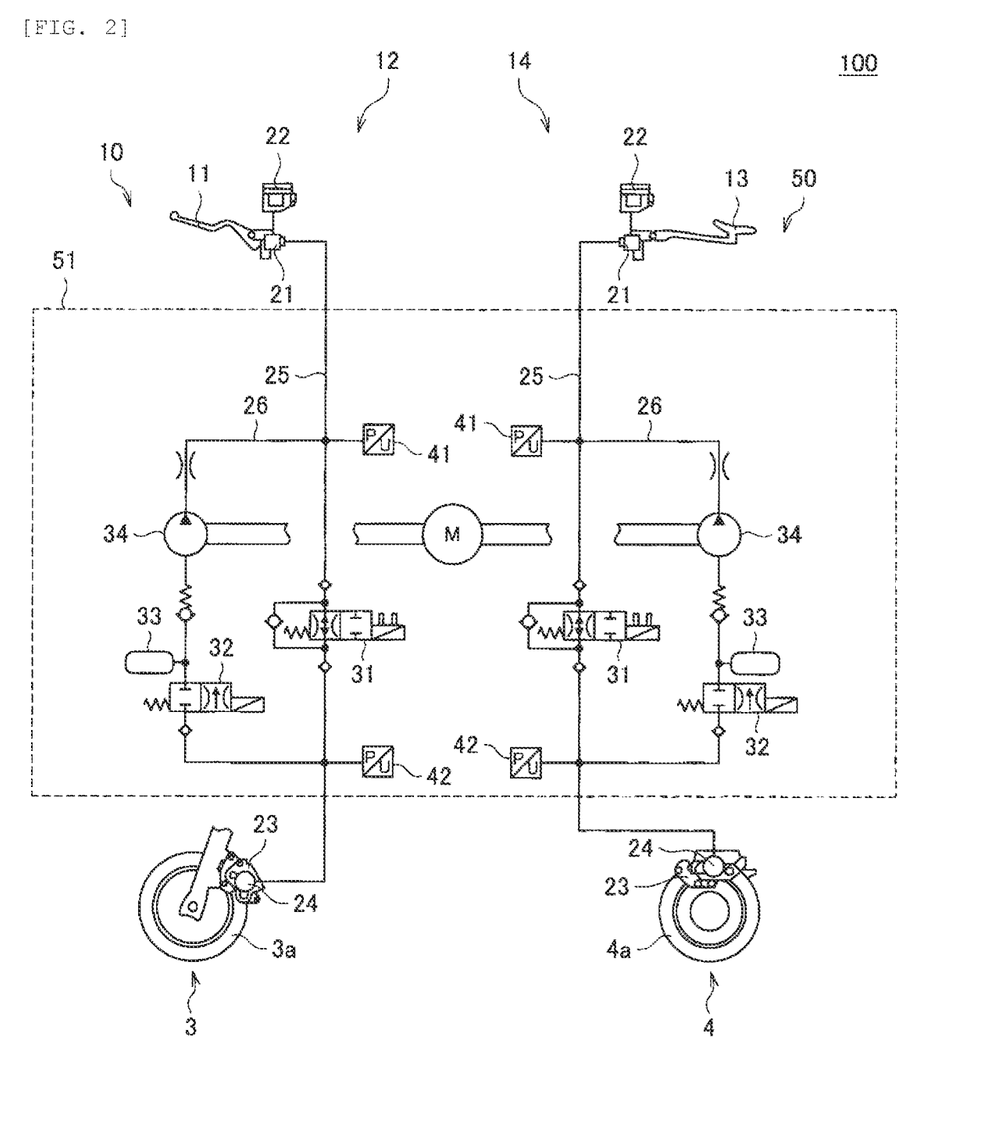
FIG. 2 is a schematic view of a configuration of a brake system according to the embodiment of the present invention.
Figure 3:
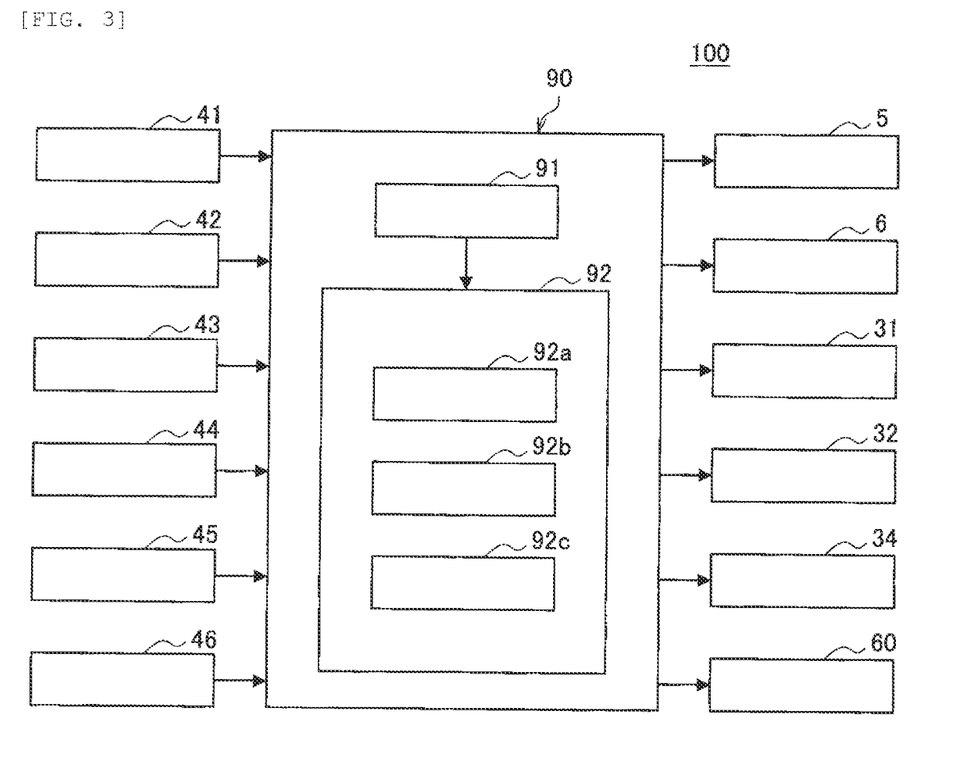
FIG. 3 is a block diagram of an exemplary functional configuration of the controller system according to the embodiment of the present invention.
Figure 4:
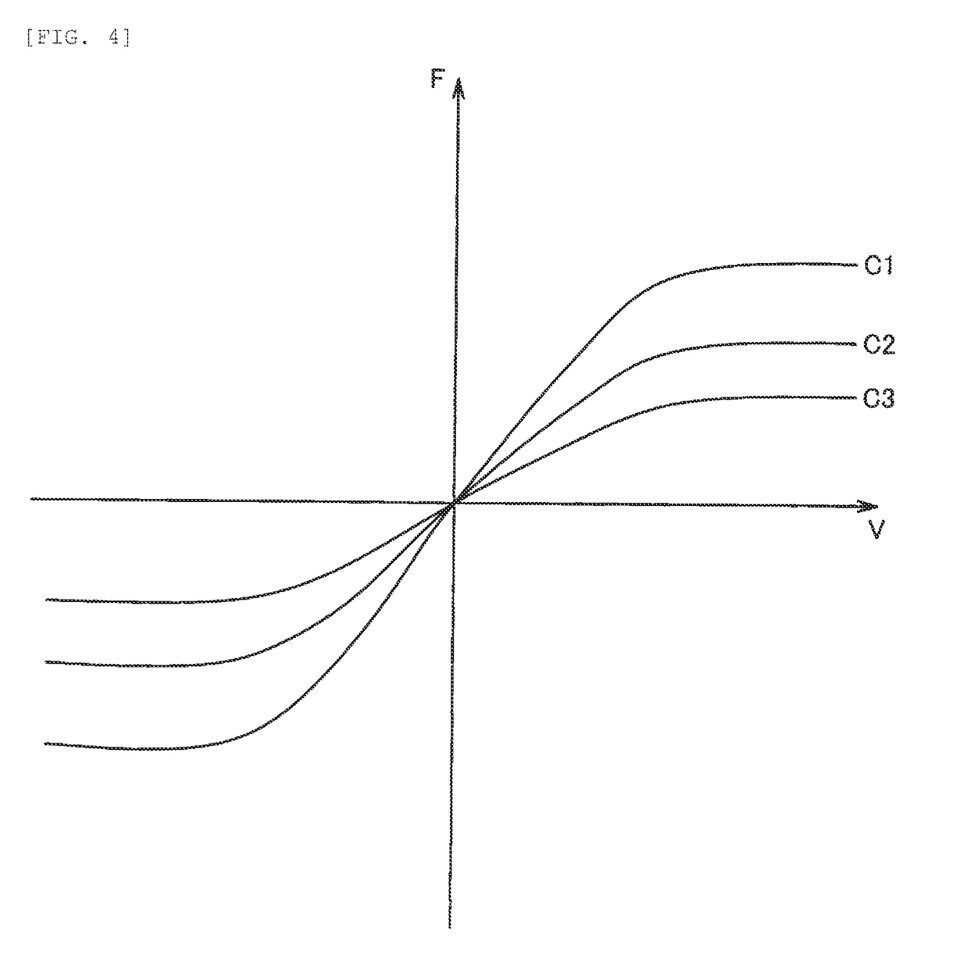
FIG. 4 is a graph for illustrating a damping characteristic of a suspension.

FIG. 1 is a schematic view of a configuration of the motorcycle 100 to which the control system 90 is mounted. FIG. 2 is a schematic view of a configuration of a brake system 10 for the motorcycle 100. FIG. 3 is a block diagram of an exemplary functional configuration of the control system 90. FIG. 4 is a graph for illustrating a damping characteristic of a suspension.

As illustrated in FIG. 1, the motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; a front suspension 5; a rear suspension 6; the brake system 10 that includes a hydraulic pressure control unit 50; and an engine 60. The motorcycle 100 further includes: master-cylinder pressure sensors 41 (see FIG. 2), wheel-cylinder pressure sensors 42 (see FIG. 2), a front-wheel rotational frequency sensor 43, a rear-wheel rotational frequency sensor 44, a front stroke sensor 45, and a rear stroke sensor 46. Moreover, as illustrated in FIG. 3, the motorcycle 100 includes the control system 90 that controls behavior of the motorcycle 100.

Each of the front suspension 5 and the rear suspension 6 corresponds to an example of a suspension of the motorcycle 100, and is interposed between the trunk 1 and the wheel. More specifically, the front suspension 5 is provided to a front fork 7 that connects the handlebar 2 and the front wheel 3, and can be extended/compressed along an axial direction of the front suspension 5. The rear suspension 6 connects the trunk 1 and a swing arm 8 that is swingably supported by the trunk 1 and holds the rear wheel 4 in the freely turnable manner, and can be extended/compressed along an axial direction of the rear suspension 6.

More specifically, each of the front suspension 5 and the rear suspension 6 includes a spring and a damper. When the spring and the damper are extended/compressed along the axial direction of the suspension, vibrations from a road surface are absorbed, and transmission of the vibrations to a body of the motorcycle 100 is suppressed. For example, in a hydraulic oil channel that is formed in the damper of the suspension, a control valve is provided to control the damping characteristic of the suspension (more specifically, a characteristic of a damping force with respect to a stroke speed of the suspension). By controlling operation of the control valve, the damping characteristic of the suspension is controlled, which further controls the damping force of the suspension.

The damping characteristic of the suspension may be controlled by a method other than the above (for example, a method for controlling a magnetic field produced in the damper by using a magnetic fluid as the hydraulic oil in the damper of the suspension).

The front stroke sensor 45 detects a stroke amount of the front suspension 5 and outputs a detection result. The front stroke sensor 45 may detect another physical quantity (for example, stroke acceleration of the front suspension 5, a force applied to the front suspension 5, or the like) that can substantially be converted to the stroke amount of the front suspension 5. The front stroke sensor 45 is provided to the front suspension 5, for example.

The rear stroke sensor 46 detects a stroke amount of the rear suspension 6 and outputs a detection result. The rear stroke sensor 46 may detect another physical quantity (for example, stroke acceleration of the rear suspension 6, a force applied to the rear suspension 6, or the like) that can substantially be converted to the stroke amount of the rear suspension 6. The rear stroke sensor 46 is provided to the rear suspension 6, for example.

As illustrated in FIG. 1 and FIG. 2, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in an interlocking manner with at least the second brake operation section 13. The brake system 10 also includes the hydraulic pressure control unit 50, and the front-wheel brake mechanism 12 and the rear-wheel brake mechanism 14 are partially included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation section 11 is provided to the handlebar 2 and is operated by the rider's hand. The first brake operation section 11 is a brake lever, for example. The second brake operation section 13 is provided in a lower portion of the trunk 1 and is operated by the rider's foot. The second brake operation section 13 is a brake pedal, for example.

Each of the front-wheel brake mechanism 12 and the rear-wheel brake mechanism 14 includes: a master cylinder 21 that includes a piston (not illustrated); a reservoir 22 that is attached to the master cylinder 21; a brake caliper 23 that is held by the trunk 1 and has a brake pad (not illustrated); a wheel cylinder 24 that is provided to the brake caliper 23; a primary channel 25 through which a brake fluid in the master cylinder 21 flows into the wheel cylinder 24; and a secondary channel 26 through which the brake fluid in the wheel cylinder 24 is released.

An inlet valve (EV) 31 is provided to the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side.

The inlet valve 31 is an electromagnetic valve that is opened in an unenergized state and closed in an energized state, for example. The outlet valve 32 is an electromagnetic valve that is closed in an unenergized state and opened in an energized state, for example.

The hydraulic pressure control unit 50 includes: components such as the inlet valves 31, the outlet valves 32, the accumulators 33, and the pumps 34 used to control a brake hydraulic pressure; and a base body 51 in which those components are provided and channels constituting the primary channels 25 and the secondary channels 26 are formed.

The base body 51 may be formed of one member or may be formed of multiple members. In the case where the base body 51 is formed of the multiple members, the components may separately be provided in the different members.

The control system 90 controls operation of each of the components in the hydraulic pressure control unit 50. In this way, the braking force to be generated to the motorcycle 100

(more specifically, the braking force to be generated on the front wheel 3 by the front-wheel brake mechanism 12 and the braking force to be generated on the rear wheel 4 by the rear-wheel brake mechanism 14) is controlled.

For example, during a normal time (that is, when the braking force corresponding to a brake operation by the rider is generated to the motorcycle 100), the control system 90 opens the inlet valves 31 and closes the outlet valves 32. When the first brake operation section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The master-cylinder pressure sensor 41 detects a hydraulic pressure of the brake fluid in the master cylinder 21 and outputs a detection result. The master-cylinder pressure sensor 41 may detect another physical quantity that can substantially be converted to the hydraulic pressure of the brake fluid in the master cylinder 21. The master-cylinder pressure sensor 41 is provided in each of the front-wheel brake mechanism 12 and the rear-wheel brake mechanism 14.

The wheel-cylinder pressure sensor 42 detects the hydraulic pressure of the brake fluid in the wheel cylinder 24 and outputs a detection result. The wheel-cylinder pressure sensor 42 may detect another physical quantity that can substantially be converted to the hydraulic pressure of the brake fluid in the wheel cylinder 24. The wheel-cylinder pressure sensor 42 is provided to each of the front-wheel brake mechanism 12 and the rear-wheel brake mechanism 14.

The engine 60 corresponds to an example of a drive source for the motorcycle 100, and can output power for driving the wheel (for example, the rear wheel 4). For example, the engine 60 is provided with: one or multiple cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause rotation of a crankshaft. A throttle valve is provided in an intake pipe of the engine 60, and an intake air amount for the combustion chamber varies in accordance with a throttle opening amount as an opening amount of the throttle valve.

The front-wheel rotational frequency sensor 43 is a rotational frequency sensor that detects a rotational frequency of the front wheel 3 (for example, a rotational frequency of the front wheel 3 per unit time [rpm], a travel distance per unit time [km/h], or the like), and outputs a detection result. The front-wheel rotational frequency sensor 43 may detect another physical quantity that can substantially be converted to the rotational frequency of the front wheel 3. The front-wheel rotational frequency sensor 43 is provided to the front wheel 3.

The rear-wheel rotational frequency sensor 44 is a rotational frequency sensor that detects a rotational frequency of the rear wheel 4 (for example, the rotational frequency of the rear wheel 4 per unit time [rpm], a travel distance per unit time [km/h], or the like), and outputs a detection result. The rear-wheel rotational frequency sensor 44 may detect another physical quantity that can substantially be converted to the rotational frequency of the rear wheel 4. The rear-wheel rotational frequency sensor 44 is provided to the rear wheel 4.

The control system 90 controls operation of each device in the motorcycle 100, so as to control the behavior of the motorcycle 100.

The control system 90 may be formed of a single controller or may be formed of multiple controllers. The controller that constitutes the control system 90 may partially or entirely be constructed of a microcomputer, a microprocessor unit, or the like, may be constructed of a member in which firmware or the like can be updated, or may be a program module or the like that is executed by a command from a CPU or the like, for example.

As illustrated in FIG. 3, the control system 90 includes an acquisition section 91 and a control section 92, for example. In the case where the control system 90 is formed of the multiple controllers, functional sections that are the acquisition section 91 and the control section 92 may be provided in the single controller or may separately be provided in the multiple controllers. For example, a suspension control section 92a, a brake control section 92b, and a brake control section 92c may separately be provided in the different controllers.

The acquisition section 91 acquires information that is output from each of the devices mounted to the motorcycle 100, and outputs the acquired information to the control section 92. For example, the acquisition section 91 acquires the information output from the master-cylinder pressure sensors 41, the wheel-cylinder pressure sensors 42, the front-wheel rotational frequency sensor 43, the rear-wheel rotational frequency sensor 44, the front stroke sensor 45, and the rear stroke sensor 46.

The control section 92 controls the damping characteristics of the suspensions in the motorcycle 100. The control section 92 further controls the braking force and drive power generated to the motorcycle 100. The control section 92 includes the suspension control section 92a, the brake control section 92b, and the drive control section 92c, for example.

The suspension control section 92a controls the damping characteristics of the front suspension 5 and the rear suspension 6, and thereby controls the damping forces of the front suspension 5 and the rear suspension 6.

More specifically, the damping force of each of the suspensions is generated in a direction that corresponds to the positive or negative stroke speed (that is, a stroke direction of each of the suspensions). A magnitude (an absolute value) of the damping force of the suspension is increased as a magnitude (an absolute value) of the stroke speed is increased. For example, FIG. 4 exemplifies damping characteristics C1, C2, C3 as the damping characteristics of the suspension. FIG. 4 illustrates each of the damping characteristics with a stroke speed V on a horizontal axis and a damping force F on a vertical axis.

In the example illustrated in FIG. 4, the magnitudes of the damping forces generated at the same stroke speed are sequentially reduced in an order of the damping characteristics C1, C2, C3. Thus, for example, by changing the damping characteristic of the suspension from the damping characteristic C2 to the damping characteristic C1, the damping force of the suspension can be increased (that is, the suspension can be hardened). Meanwhile, by changing the damping characteristic of the suspension from the damping characteristic C2 to the damping characteristic C3, the damping force of the suspension can be reduced (that is, the suspension can be softened). In order to facilitate understanding, FIG. 4 illustrates the three damping characteristics in a discrete manner. However, the damping characteristic of each of the front suspension 5 and the rear suspension 6 may be continuously changeable.

More specifically, the suspension control section 92a controls the damping forces of the front suspension 5 and the rear suspension 6 so as to suppress pitching of the motorcycle 100 (that is, a change in a posture of the motorcycle 100 in a direction in which the motorcycle 100 rotates about an axis in a vehicle right-left direction). For example, the suspension control section 92a controls the damping forces of the front suspension 5 and the rear suspension 6 by using the stroke amount of the front suspension 5 detected by the front stroke sensor 45 and the stroke amount of the rear suspension 6 detected by the rear stroke sensor 46. In this way, the suspension control section 92a can suppress the pitching of the motorcycle 100. In detail, the suspension control section 92a hardens the front suspension 5 and the rear suspension 6 as the pitching of the motorcycle 100 is increased, for example. In this way, the suspension control section 92a can suppress the pitching of the motorcycle 100.

The brake control section 92b controls the braking force to be generated to the motorcycle 100 by controlling operation of each of the components of the hydraulic pressure control unit 50 in the brake system 10.

In the normal time, as described above, the brake control section 92b controls the operation of each of the components in the hydraulic pressure control unit 50 such that the braking force corresponding to the brake operation by the rider is generated to the motorcycle 100. Meanwhile, under a particular situation, the brake control section 92b executes control for adjusting the braking force to be generated to the motorcycle 100 from the braking force corresponding to the brake operation by the rider (for example, the anti-lock brake control, which will be described later).

For example, the brake control section 92b brings the motorcycle 100 into a state where the inlet valve 31 is closed and the outlet valve 32 is opened, and drives the pump 34 in such a state. In this way, the brake control section 92b reduces the hydraulic pressure of the brake fluid in the wheel cylinder 24, and can thereby reduce the braking force to be generated on the wheel. In addition, for example, the brake control section 92b closes both of the inlet valve 31 and the outlet valve 32 from the above state. In this way, the brake control section 92b keeps the hydraulic pressure of the brake fluid in the wheel cylinder 24, and can thereby keep the braking force to be generated on the wheel. Furthermore, for example, the brake control section 92b opens the inlet valve 31 and closes the outlet valve 32 from the above state. In this way, the brake control section 92b increases the hydraulic pressure of the brake fluid in the wheel cylinder 24, and can thereby increase the braking force to be generated on the wheel.

The drive control section 92c controls the drive power to be generated to the motorcycle 100 by controlling operation of each of the devices (the throttle valve, the fuel injector, the ignition plug, and the like) in the engine 60.

In a normal time, the drive control section 92c controls the operation of each of the devices in the engine 60 such that the drive power corresponding to an accelerator operation by the rider (more specifically, an operation to twist an accelerator grip of the handlebar 2) is generated to the motorcycle 100. Meanwhile, under a particular situation, the drive control section 92c executes control for adjusting the drive power to be generated to the motorcycle 100 from the drive power corresponding to the accelerator operation by the rider (for example, the traction control, which will be described later).

For example, the drive control section 92c controls the operation of the throttle valve in the engine 60 so as to reduce the throttle opening amount. In this way, the drive control section 92c can reduce the intake air amount and thereby reduce the drive power to be transmitted to the wheel. In addition, for example, the drive control section 92c controls the operation of the throttle valve in the engine 60 so as to increase the throttle opening amount. In this way, the drive control section 92c can increase the intake air amount and thereby increase the drive power to be transmitted to the wheel.

Here, the control section 92 executes the slip suppression control for suppressing slippage of the motorcycle 100. For example, as the slip suppression control, the control section 92 can execute the anti-lock brake control and the traction control.

The anti-lock brake control is control for suppressing locking of the wheel during braking of the motorcycle 100.

For example, when a slip rate of the wheel (that is, a value that is obtained by dividing a difference between a vehicle speed and the wheel rotational frequency by the vehicle speed) exceeds a reference slip rate during braking of the motorcycle 100, the control section 92 executes the anti-lock brake control. For example, the control section 92 executes the anti-lock brake control for the front wheel 3 as a target when the slip rate of the front wheel 3 exceeds the reference slip rate during braking of the motorcycle 100, and executes the anti-lock brake control for the rear wheel 4 as the target when the slip rate of the rear wheel 4 exceeds the reference slip rate during braking of the motorcycle 100. Here, the reference slip rate is a value set such that it is possible to appropriately determine whether the slip rate is high enough to cause locking or possible locking of the wheel, and can appropriately be set according to a specification of the vehicle. For example, the control section 92 can estimate the slip rate by using the front-wheel rotational frequency sensor 43 and the rear-wheel rotational frequency sensor 44, for example.

Then, in the anti-lock brake control, the control section 92 estimates a friction circle as a target amount of a friction force that can be generated by a tire, and adjusts the braking force to be generated on the wheel as the control target. In detail, in the anti-lock brake control, the control section 92 reduces the braking force to be generated on the wheel as the control target such that a point indicative of the friction force applied to the tire is within the friction circle on a coordinate plane that has coordinate axes indicating the friction force in a front-rear direction and the friction force in a lateral direction. In this way, it is possible to suppress locking of the wheel during braking of the motorcycle 100.

The traction control is control for suppressing a wheel slip during acceleration of the motorcycle 100.

For example, the control section 92 executes the traction control when a slip rate of a drive wheel exceeds the reference slip rate during the acceleration of the motorcycle 100. In detail, when the slip rate of the rear wheel 4 as the drive wheel exceeds the reference slip rate during the acceleration of the motorcycle 100, the control section 92 executes the traction control so as to adjust the drive power to be generated to the rear wheel 4.

Then, in the traction control, the control section 92 estimates the friction circle as the target amount of the friction force that can be generated by the tire, and adjusts the drive power to be generated to the rear wheel 4 as the drive wheel. In detail, in the traction control, the control section 92 reduces the drive power to be generated to the rear wheel 4 such that the point indicative of the friction force applied to the tire is within the friction circle on the coordinate plane that has the coordinate axes indicating the friction force in the front-rear direction and the friction force in the lateral direction. In this way, it is possible to suppress the slippage of the wheel (more specifically, the drive wheel) during the acceleration of the motorcycle 100.

As described above, the control section 92 in the control system 90 executes the slip suppression control for suppressing the slippage of the motorcycle 100. Here, the control section 92 estimates the damping force to be generated to each of the suspensions on the basis of the damping characteristic and the stroke speed of each of the suspensions in the motorcycle 100, and executes the slip suppression control by using a target amount corresponding to the estimated damping force. In this way, the slip suppression control for the motorcycle 100 is appropriately executed. Processing for such slip suppression control, which is executed by the control system 90, will be described later in detail.

<Operation of Control System>

A description will be made on operation of the control system 90 according to the embodiment of the present invention with reference to FIG. 5 and FIG. 6.

A description will hereinafter be made on processing related to the estimation of the friction circle used in the slip suppression control with reference to FIG. 5, and then a description will be made on processing related to the execution of the slip suppression control with reference to FIG. 6.

Figure 5:
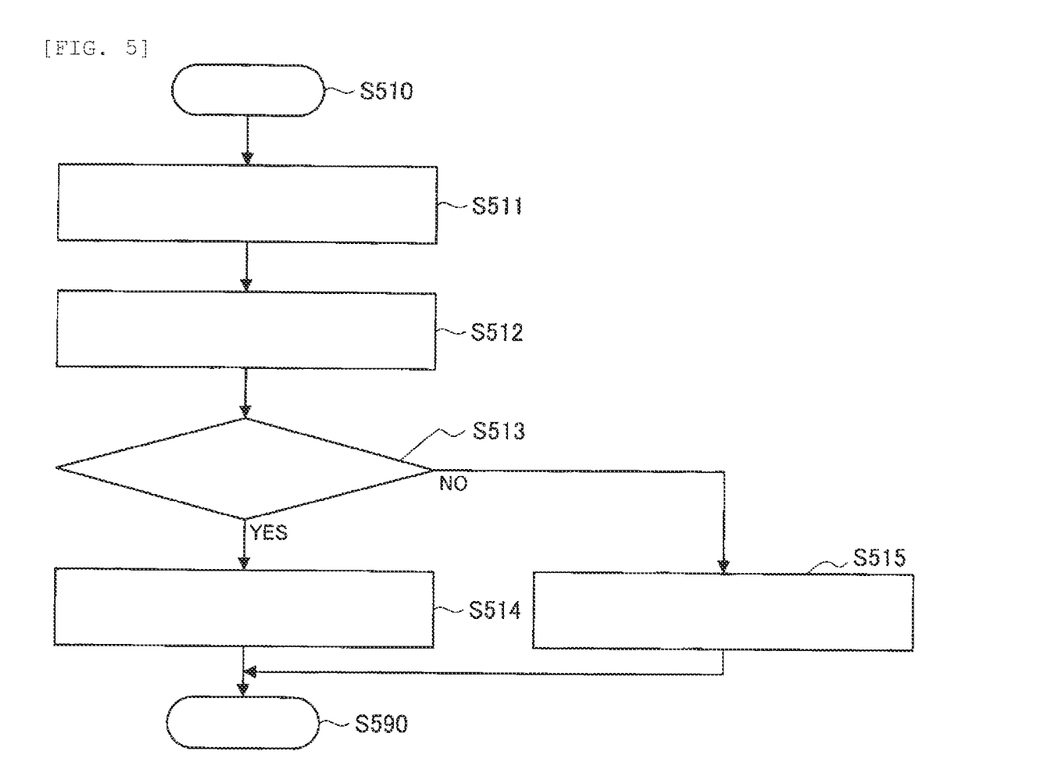
FIG. 5 is a flowchart of an example of a processing procedure that is executed by the control system according to the embodiment of the present invention and is related to estimation of a friction circle.

FIG. 5 is a flowchart of an example of a processing procedure that is executed by the control system 90 and is related to the estimation of the friction circle. More specifically, the control flow illustrated in FIG. 5 is processing that is executed by the control section 92 in the control system 90 and is, for example, executed during braking, the acceleration, or turning of the motorcycle 100 (that is, under a situation where the relatively large friction force is generated to the tires during travel). In addition, step S510 and step S590 in FIG. 5 respectively correspond to initiation and termination of the control flow illustrated in FIG. 5.

When the control flow illustrated in FIG. 5 is initiated, in step S511, the control section 92 estimates the stroke speed of each of the suspensions in the motorcycle 100.

For example, the control section 92 can estimate the stroke speed of the front suspension 5 on the basis of a transition of the stroke amount of the front suspension 5 detected by the front stroke sensor 45. In addition, the control section 92 can estimate the stroke speed of the rear suspension 6 on the basis of a transition of the stroke amount of the rear suspension 6 detected by the rear stroke sensor 46.

Next, in step S512, the control section 92 estimates the damping force to be generated to each of the suspensions in the motorcycle 100.

Here, the control section 92 estimates the damping force to be generated to each of the suspensions on the basis of the damping characteristic and the stroke speed of each of the suspensions. For example, the control section 92 can estimate the damping force to be generated to the front suspension 5 on the basis of the damping characteristic of the front suspension 5 and the stroke speed of the front suspension 5 estimated in step S511. In addition, the control section 92 can estimate the damping force to be generated to the rear suspension 6 on the basis of the damping characteristic of the rear suspension 6 and the stroke speed of the rear suspension 6 estimated in step S511.

Next, in step S513, the control section 92 determines whether the damping force to be generated to each of the suspensions in the motorcycle 100 estimated in step S512 is larger than a threshold value. If it is determined that the estimated damping force is larger than the threshold value (step S513/YES), the processing proceeds to step S514. On the other hand, if it is determined that the estimated damping force is equal to or smaller than the threshold value (step S513/NO), the processing proceeds to step S515.

For example, as the damping force that is a comparison target with the threshold value used in the determination in step S513, the control section 92 may use a value to which both of the damping force to be generated to the front suspension 5 and the damping force to be generated to the rear suspension 6 are reflected (for example, an average value of both of the damping forces), or may use one of the damping force to be generated to the front suspension 5 and the damping force to be generated to the rear suspension 6 (for example, the smaller damping force of the damping forces).

As will be described below, the damping force that is generated when the suspension is compressed can be used as an index of a repulsive force (that is, a restoring force) of the tire and the spring of the suspension and can also be used as an index of a force generated between the tire and the road surface. The friction circle that is determined as the target amount used in the slip suppression control (in other words, a target tire friction circle) is determined on the basis of the index. More specifically, in the control flow illustrated in FIG. 5, the target tire friction circle is switched between a first friction circle and a second friction circle depending on whether the damping force to be generated to each of the suspensions is larger than the threshold value. Thus, more specifically, the threshold value used for the determination in step S513 is set to a value with which it is possible to appropriately determine whether likeliness of generation of the friction between the tire and the road surface is high enough to use the first friction circle in the slip suppression control or low enough to use the second friction circle in the slip suppression control.

If it is determined YES in step S513, in step S514, the control section 92 determines the first friction circle as the friction circle that is the target amount used in the slip suppression control. On the other hand, if it is determined NO in step S513, in step S515, the control section 92 determines the second friction circle as the friction circle that is the target amount used in the slip suppression control.

Here, the first friction circle is the larger friction circle (for example, the friction circle having a larger radius) than the second friction circle. The friction circles, such as the first friction circle and the second friction circle, used in the slip suppression control may each be a true circle or an oval.

After step S514 or step S515, the control flow illustrated in FIG. 5 is terminated.

As described above, the control section 92 estimates the damping force to be generated to each of the suspensions on the basis of the damping characteristic and the stroke speed of each of the suspensions in the motorcycle 100, and determines the target amount (for example, the friction circle) used in the slip suppression control according to the estimated damping force.

Here, the friction force generated between the tire and the road surface (that is, the friction force applied to the tire) is correlated with a ground load of the tire. More specifically, as the ground load of the tire is increased, the friction force generated between the tire and the road surface is increased. In addition, the ground load of the tire is expressed by a sum of the repulsive force of the tire (that is, the restoring force corresponding to a spring constant of the tire), the repulsive force of the spring of the suspension (that is, the restoring force corresponding to a spring constant of the suspension), and the damping force generated to the suspension (the damping force by the damper of the suspension). Accordingly, as the damping force generated to the suspension is increased, the ground load of the tire is increased, and further the friction force generated between the tire and the road surface is increased. Thus, the damping force generated to the suspension can be considered as the index of the likeliness of the generation of the friction between the tire and the road surface.

The target amount used in the slip suppression control is determined according to the damping force generated to each of the suspensions. In this way, the target amount can be determined according to the likeliness of the generation of the friction between the tire and the road surface. Therefore, it is possible to optimize the target amount used in the slip suppression control.

More specifically, from a perspective of optimizing the friction circle that is the target amount used in the slip suppression control, it is desired that, when the damping force generated to the suspension is larger than the threshold value as in the control flow illustrated in FIG. 5, the control section 92 determines, as the target amount used in the slip suppression control, the larger friction circle than the friction circle that is used when the damping force is smaller than the threshold value. Thus, the friction circle can be determined according to the likeliness of the generation of the friction between the tire and the road surface.

Figure 6:
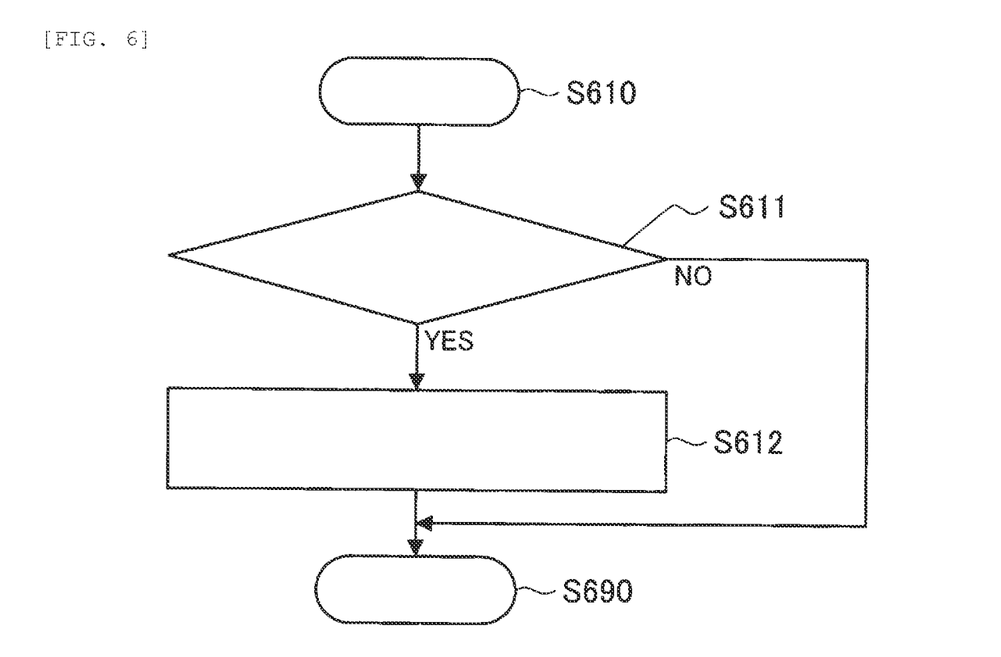
FIG. 6 is a flowchart of an example of a processing procedure that is executed by the control system according to the embodiment of the present invention and is related to execution of slip suppression control.

FIG. 6 is a flowchart of an example of a processing procedure that is executed by the control system 90 and is related to the execution of the slip suppression control. More specifically, the control flow illustrated in FIG. 6 corresponds to the processing that is executed by the control section 92 in the control system 90, and is repeatedly executed. In addition, step S610 and step S690 in FIG. 6 respectively correspond to initiation and termination of the control flow illustrated in FIG. 6.

When the control flow illustrated in FIG. 6 is initiated, in step S611, the control section 92 determines whether an execution condition of the slip suppression control is satisfied. If it is determined that the execution condition of the slip suppression control is satisfied (step S611/YES), the processing proceeds to step S612. On the other hand, if it is determined that the execution condition of the slip suppression control is not satisfied (step S611/NO), the control flow illustrated in FIG. 6 is terminated.

More specifically, the control section 92 determines whether the execution conditions corresponding to the anti-lock brake control and the traction control are each satisfied.

For example, in the case where the motorcycle 100 currently brakes and the slip rate of the wheel exceeds the reference slip rate, the control section 92 determines that the execution condition of the anti-lock brake control is satisfied.

For example, in the case where the motorcycle 100 currently accelerates and the slip rate of the drive wheel exceeds the reference slip rate, the control section 92 determines that the execution condition of the traction control is satisfied.

If it is determined YES in step S611, in step S612, the control section 92 executes the slip suppression control. More specifically, the control section 92 executes the slip suppression control that corresponds to the satisfied execution condition.

As described above with reference to FIG. 5, the target amount (for example, the friction circle) used in the slip suppression control is determined according to the damping force that is generated to each of the suspensions and is estimated on the basis of the damping characteristic and the stroke speed of each of the suspensions. Then, in step S611, the slip suppression control is executed by using the determined target amount. More specifically, the control section 92 executes the slip suppression control by using the target amount corresponding to the damping force that is generated to each of the suspensions and is estimated on the basis of the damping characteristic and the stroke speed of each of the suspensions. In this way, it is possible to execute the slip suppression control after optimizing the target amount used in the slip suppression control.

Next, the control flow illustrated in FIG. 6 is terminated.

The above description has been made on the example in which the damping force generated to each of the suspensions is used as a parameter for determining the target amount used in the slip suppression control. However, as the parameter for determining the target amount used in the slip suppression control, in addition to the damping force generated to each of the suspensions, a parameter (for example, the drive power or the braking force generated to the motorcycle 100 or an inclination angle of the body) other than the damping force may further be used.

For example, from a perspective of further effectively optimizing the target amount used in the slip suppression control, the control section 92 preferably estimates the restoring force to be generated to each of the suspensions on the basis of a stroke position of each of the suspensions in the motorcycle 100, and then preferably executes the slip suppression control by using, in addition to the damping force, the target amount corresponding to the estimated restoring force.

As described above, the ground load of the tire is expressed by the sum of the restoring force generated to the tire, the restoring force generated to the suspension, and the damping force generated to the suspension. Accordingly, as the restoring force generated to the suspension is increased, the ground load of the tire is increased. As a result, the friction force generated between the tire and the road surface is increased. Thus, in addition to the damping force generated to the suspension, the restoring force generated to the suspension can also be considered as the index of the likeliness of the generation of the friction between the tire and the road surface.

By determining the target amount used in the slip suppression control according to the damping force and the restoring force generated to the suspension, it is possible to further appropriately determine the target amount according to the likeliness of the generation of the friction between the tire and the road surface. Therefore, it is possible to further effectively optimize the target amount used in the slip suppression control.

More specifically, from the perspective of further effectively optimizing the friction circle that is the target amount used in the slip suppression control, the control section 92 preferably changes the friction circle, which is the target amount used in the slip suppression control, on the basis of the damping force and the restoring force. For example, the radius of the friction circle is increased as a total value of the damping force and the restoring force generated to the suspension is increased. In this way, the friction circle that is used as the target amount in the slip suppression control can further appropriately be determined.

<Effects of Control System>

A description will be made on effects of the control system 90 according to the embodiment of the present invention.

The control system 90 includes the control section 92 that controls the damping characteristic of the suspension in the motorcycle 100. In addition, the control section 92 estimates the damping force to be generated to the suspension on the basis of the damping characteristic and the stroke speed of the suspension, and executes the slip suppression control for suppressing the slippage of the motorcycle 100 by using the target amount corresponding to the estimated damping force. In this way, it is possible to execute the slip suppression control after optimizing the target amount used in the slip suppression control. Therefore, it is possible to appropriately execute the slip suppression control for the motorcycle 100.

Preferably, as the slip suppression control, the control section 92 in the control system 90 executes the anti-lock brake control for suppressing locking of the wheel during braking of the motorcycle 100. In this way, it is possible to execute the anti-lock brake control after optimizing the target amount used in the anti-lock brake control. Therefore, it is possible to appropriately suppress locking of the wheel during braking of the motorcycle 100.

Preferably, as the slip suppression control, the control section 92 in the control system 90 executes the traction control for suppressing the wheel slip during the acceleration of the motorcycle 100. In this way, it is possible to execute the traction control after optimizing the target amount used in the traction control. Therefore, it is possible to appropriately suppress the wheel (more specifically, the drive wheel) slip during the acceleration of the motorcycle 100.

Preferably, when the damping force generated to the motorcycle 100 is larger than the threshold value, the control section 92 in the control system 90 executes the slip suppression control by using, as the target amount, the larger friction circle than the friction circle that is used when the damping force is smaller than the threshold value. In this way, it is possible to execute the slip suppression control by using such a friction circle that optimizes the target amount used in the slip suppression control. Therefore, it is possible to appropriately execute the slip suppression control in which the friction circle is used as the target amount.

Preferably, the control section 92 in the control system 90 estimates the restoring force to be generated to the suspension on the basis of the stroke position of the suspension, and executes the slip suppression control by using the target amount corresponding to the estimated restoring force. In this way, it is possible to execute the slip suppression control after further effectively optimizing the target amount used in the slip suppression control. Therefore, it is possible to further effectively and appropriately execute the slip suppression control for the motorcycle 100.

Preferably, the control section 92 in the control system 90 changes the friction circle, which is the target amount used in the slip suppression control, on the basis of the damping force and the restoring force generated to the motorcycle 100. As a result, for example, the radius of the friction circle is increased as the total value of the damping force and the restoring force generated to the suspension is increased. In this way, the friction circle that is used as the target amount in the slip suppression control can further appropriately be determined. Therefore, it is possible to further effectively and appropriately execute the slip suppression control in which the friction circle is used as the target amount.

The present invention is not limited to each of the embodiments. For example, all or parts of the embodiments may be combined, or only a part of each of the embodiments may be implemented.

REFERENCE SIGNS LIST

1: Trunk
2: Handlebar
3: Front wheel
3a: Rotor
4: Rear wheel
4a: Rotor
5: Front suspension
6: Rear suspension
7: Front fork
8: Swing arm
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
31: Inlet valve
32: Outlet valve
33: Accumulator
34: Pump
41: Master-cylinder pressure sensor
42: Wheel-cylinder pressure sensor
43: Front-wheel rotational frequency sensor
44: Rear-wheel rotational frequency sensor
45: Front stroke sensor
46: Rear stroke sensor
50: Hydraulic pressure control unit
51: Base body
60: Engine
90: Control system
91: Acquisition section
92: Control section
92a: Suspension control section
92b: Brake control section
92c: Drive control section
100: Motorcycle

The invention claimed is:

1. A control system (90) for controlling behavior of a straddle-type vehicle (100) that includes a suspension (5, 6), the control system comprising:
   a control section (92) that controls a damping characteristic of the suspension (5, 6), wherein
   the control section (92)
      estimates a damping force to be generated to the suspension (5, 6) on the basis of the damping characteristic and a stroke speed of the suspension (5, 6), and
      executes slip suppression control for suppressing slippage of the straddle-type vehicle (100) by using a target amount corresponding to the estimated damping force.

2. The control system according to claim 1, wherein as the slip suppression control, the control section (92) executes anti-lock brake control for suppressing locking of a wheel (3, 4) during braking of the straddle-type vehicle (100).

3. The control system according to claim 1, wherein as the slip suppression control, the control section (92) executes traction control for suppressing slippage of a wheel (3, 4) during acceleration of the straddle-type vehicle (100).

4. The control system according to claim 1, wherein in the case where the damping force is larger than a threshold value, the control section (92) executes the slip suppression control by using, as the target amount, a larger friction circle than a friction circle that is used when the damping force is smaller than the threshold value.

5. The control system according to claim 1, wherein the control section (92)
   estimates a restoring force to be generated to the suspension (5, 6) on the basis of a stroke position of the suspension (5, 6), and
   executes the slip suppression control by using the target amount corresponding to the estimated restoring force.

6. The control system according to claim 5, wherein the control section (92) changes a friction circle, which is the target amount used in the slip suppression control, on the basis of the damping force and the restoring force.

7. A control method for controlling behavior of a straddle-type vehicle (100) that includes a suspension (5, 6), and a damping characteristic of the suspension (5, 6) being controlled by a control system (90), the control method comprising:
   an estimation step (S512) of estimating a damping force to be generated to the suspension (5, 6) on the basis of the damping characteristic and a stroke speed of the suspension (5, 6); and
   an execution step (S612) of executing slip suppression control for suppressing slippage of the straddle-type vehicle (100) by using a target amount corresponding to the estimated damping force.

* * * * *